E. LOMMATZSCH.
BEARING FOR CENTRIFUGAL MACHINES.
APPLICATION FILED AUG. 24, 1912.

1,095,337.

Patented May 5, 1914.

2 SHEETS—SHEET 1.

Witnesses:
Richard Schuhmann
Rudolph Fricke

Inventor:
Ernst Lommatzsch

E. LOMMATZSCH.
BEARING FOR CENTRIFUGAL MACHINES.
APPLICATION FILED AUG. 24, 1912.

1,095,337.

Patented May 5, 1914.
2 SHEETS—SHEET 2.

Witnesses:

Inventor:

UNITED STATES PATENT OFFICE.

ERNST LOMMATZSCH, OF EYTHRA, NEAR LEIPZIG, GERMANY, ASSIGNOR OF ONE-HALF TO PAUL HUGO SCHLICK, OF GERA, REUSS, GERMANY.

BEARING FOR CENTRIFUGAL MACHINES.

1,095,337. Specification of Letters Patent. Patented May 5, 1914.

Application filed August 24, 1912. Serial No. 716,887.

*To all whom it may concern:*

Be it known that I, ERNST LOMMATZSCH, a subject of the Emperor of Germany and resident of Eythra, near Leipzig, Germany, have invented certain new Improvements in Bearings for Centrifugal Machines, of which the following is a specification.

The present invention relates to a centrifugal machine of the kind in which the masses rotate about a horizontal axis, its object being to reduce friction and insure smooth running, thereby reducing the expenditure of driving power as well as removing the main causes of breakage.

According to the invention the horizontally rotated shaft has at each end a roller by means of which it is supported on the rim of a wheel the axis of which is arranged in the same perpendicular plane as that of the shaft, the wheel being itself mounted on a ball-bearing. This wheel, which is considerably larger than the roller and which therefore rotates at a slow speed, supports all the downward vertical forces which mainly act on the shaft. Minor forces acting in other directions are supported by two or more ball-bearings, each of which, while embracing the shaft, is connected to a single-armed pivoted lever. The free end of the latter is acted upon by a spring which tends to hold the shaft against the respective wheel. Any wear of the elements, therefore, will be compensated for by the springs which keep the shaft steadily against the supporting wheels, a smooth running being thus insured. It is evident that the shaft, and the masses connected thereto, will, when supported in bearings of this description, move with minimum friction.

Figure 1:
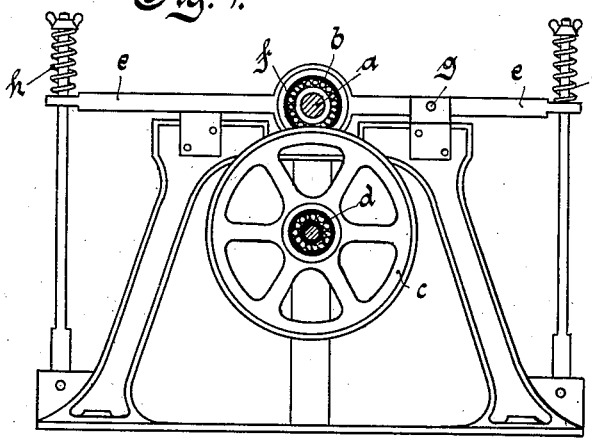
Figure 3:
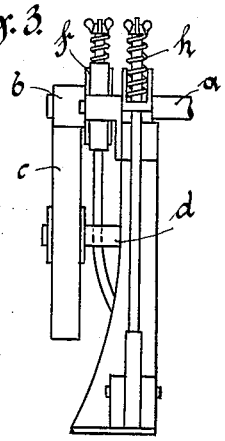
Figure 2:
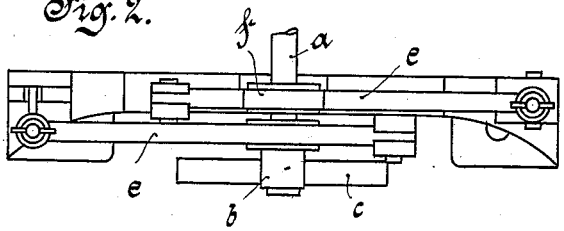
Figure 4:
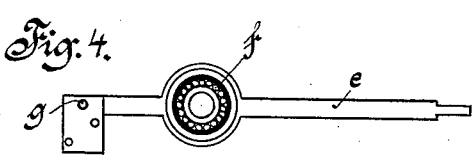
Figure 5:
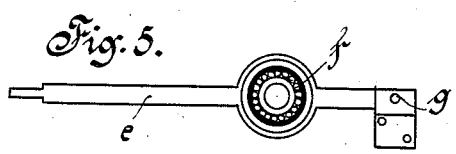
Figure 6:
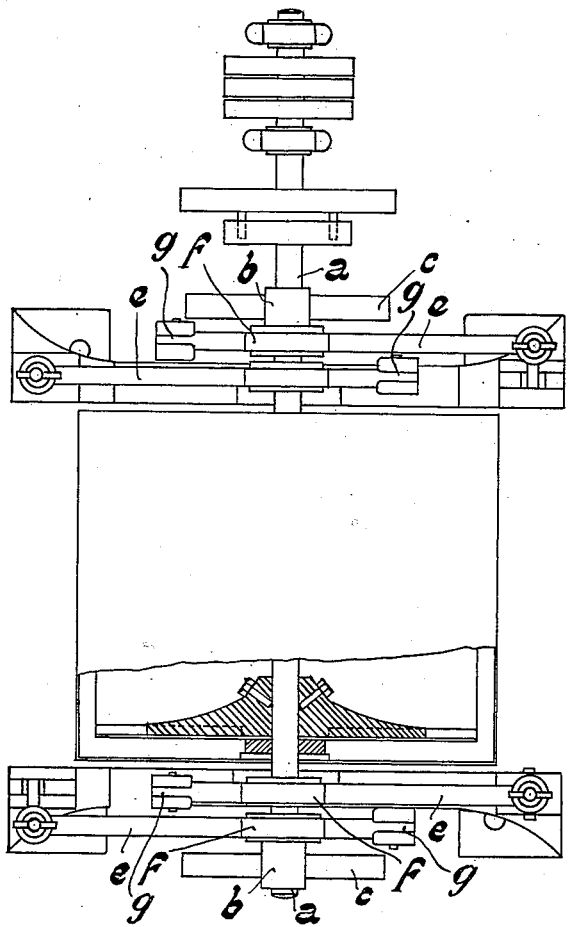

In the accompanying drawings the invention is illustrated, Figure 1 representing a front view of the bearing, Fig. 2, a plan, and Fig. 3, a side view of the same. Figs. 4 and 5 are detailed views of the levers and their ball-bearings. Fig. 6 is a plan of the whole machine, the centrifugal cylinder being shown partly in section.

The rotating masses are carried by a shaft $a$ to each end of which a roller $b$ is firmly connected. The shaft is supported by means of this roller on the rim of a wheel $c$ which is mounted, through the medium of a ball-bearing, on a stud $d$ connected to the machine frame, said stud being arranged in the same perpendicular plane as the shaft $a$. Since the forces acting on the shaft are mainly directed downward it is evident that said shaft will be almost exclusively supported on the wheel, and since the latter, being much larger than the roller, moves slowly and easily about its ball-bearing, very little friction will ensue.

For holding the shaft on the wheel and supporting any laterally or upwardly directed force, ball-bearings $f$ are provided. These bearings embrace the shaft and each one is held by a single-armed lever $e$, such levers being pivoted at $g$ to brackets secured to the machine frame. The free end of each lever is apertured for the admission of a vertical rod on which it is guided, and a spring $h$ is arranged on said rod so as to abut against the lever and press the shaft against the wheels $c$. The pressure of the springs is adjusted in conformity with the leverage. Irrespective of the wear of the different elements, therefore, the shaft will always be held by the levers steadily against the supporting wheel. Vibrations of the shaft are thus effectively prevented and a smooth running insured. Upwardly directed forces will be supported by the springs $h$ and laterally directed forces by the pivots $g$ of the levers. In the case of small machines it will be sufficient to arrange one ball-bearing $f$ at each end of the shaft; for larger machines it is advisable to employ two ball-bearings at each end, pivoted at opposite sides of the shaft, as shown in the figures. Since the forces acting on the shaft are, as previously noticed, mainly directed downward, there will be but little pressure for the bearings $f$ to support so that excessive wear of the same is excluded.

I claim:—

1. A bearing for centrifugal machines with horizontally rotating shaft, comprising a wheel mounted on a ball-bearing, a roller firmly connected to the end of the shaft so as to support the latter on the rim of said wheel, ball-bearings embracing the shaft near the roller and carried by single-armed pivoted levers, and springs abutting against the free ends of said levers so as to press the shaft against the supporting wheel, substantially as and for the purpose set forth.

2. A bearing for centrifugal machines with horizontally arranged shaft, comprising a wheel mounted on a ball-bearing and adapted to support the end of the shaft on its rim, two ball-bearings embracing the end of the shaft and carried by single-armed levers, said levers being pivoted at opposite sides of the shaft, and springs abutting against the free ends of the levers so as to press the shaft against the supporting wheel, substantially as and for the purpose set forth.

In testimony whereof I have signed my name to this specification, in the presence of two subscribing witnesses.

ERNST LOMMATZSCH.

Witnesses:
RICHARD SCHÜHMANN,
RUDOLPH FRICKE.